Figure 1:
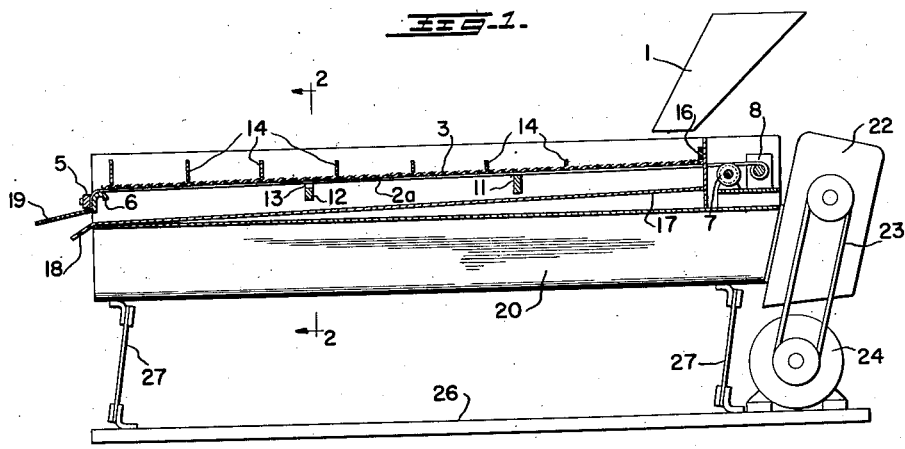

July 16, 1957 — H. HEYMANN — 2,799,398
APPARATUS FOR SEPARATING LIQUIDS FROM SLUDGES
Filed April 24, 1953

INVENTOR
HANS HEYMANN
BY Jewett, Mead, Browne & Schuyler
ATTORNEYS

UNITED STATES PATENT OFFICE 2,799,398
Patented July 16, 1957

2,799,398

APPARATUS FOR SEPARATING LIQUIDS FROM SLUDGES

Hans Heymann, Ulm (Danube), Germany

Application April 24, 1953, Serial No. 350,987

2 Claims. (Cl. 210—388)

The present invention relates to the separation of liquid from sludges.

An object of the invention is to concentrate sludge, so that a dense solid residue is obtainable which can be readily handled or disposed of.

Another object of the invention is to separate the liquid content, or as great a proportion thereof as is possible, from sludges of a colloidal nature, or from sludges bearing in suspension a material proportion of solid matter in a colloidal form.

A further object of the invention is to effect the purification of sewage, or like effluents, and obtain residues of substantially solid material that can be readily handled.

From the economic aspect, the concentrating of sludges by means of centrifuges, vibre-sieves, filter presses and the like is more efficient, the larger the proportion of solid material deposited from a given amount of sludge. Removal of water by such means has, however, hitherto only been practicable in the case of sludges having only a very small portion of, or no, colloidal material in suspension.

If the quantity of colloidal material predominates, the above mentioned machines cannot be employed, because the meshes of the hair sieves, like the pores of a filter cloth, within a very short time become choked with slime, to such an extent that continued operation is no longer possible. Colloidal sludges are consequently at present still classed as one of the special problems of many industrial concerns, because the cost of means required for the concentration or further retreatment of these sludges far outweighs the value of processing them.

A typical example of this kind is the sludge which accumulates in large quantities with a water content of at least 85% in the purification of domestic or industrial sewage. Where sludge with substances capable of putrefaction is concerned, gas can be obtained from the sludge by the use of special putrefying towers. However, after this removal of gas, there arises, just as in the case of fresh sludge, the question of disposal of the remaining sludge. In municipal purification plants, the policy has been adopted of laying out beds for the drying of sludge which has finished putrefying, that is to say effecting the drying by the sun and wind. This solution is, however, more expensive, because it is necessary to make land available for the construction of the beds, the land then being lost for agriculture or housing. The size of these beds can be calculated from the fact that the drying of sludge takes several months in mid-summer, the most favourable season. In the case of large plants, there has at different times been no other course than to erect a damming wall in a remote valley in order to obtain a lake into which the accumulating sludge is pumped. As this sludge remains unchanged for decades, and the capacity of such a lake to accept further sludge will one day be exhausted, a solution of this kind can only be considered temporary and must one day be replaced by a more adequate one.

In these and similar cases, the present invention renders the concentration of sludges possible by mechanical vibration means capable of continuous operation, so that the conveying away or further treatment of the sludges no longer gives rise to substantial costs. The invention is nevertheless not restricted to sludges of a colloidal nature, but can be employed quite generally for sludges of all kinds.

According to the present invention the sludge to be purified is allowed to flow by gravity down a flexible inclined surface pervious to liquid, but impervious to sludge, while the flowing column of sludge is subjected to sonic vibration.

Preferably the vibrations are produced by resilient elements set in vibration at their natural frequency and at higher harmonics thereof.

An apparatus according to the invention comprises, a porous table, for instance of fibrous material, set at an angle to the horizontal, and supported on tensioned resilient elements such as wires, passing over nodal points, so that when set in vibration, the resilient elements vibrate at their natural frequency and at the higher harmonics thereof.

Resilient members, in the manner of weirs, of increasing height along the length of the table may be disposed laterally across the table.

The highly resilient supporting surface or table is provided with meshes or pores which at the same time serve to destroy the colloidal linkage of, and at the same time to separate the particles and the liquid of the sludges. This surface is formed as a hair sieve or filter cloth, which is loosely supported upon the resilient elements, such as pre-tensioned wires. In order, when steel wires are used, to avoid corrosion thereof and also rubbing through of the hair sieve or filter cloth, the wires may be given a sheathing of rubber or synthetic material. Closely above this resilient surface are loosely tensioned bands or wires which hold the actual sieve covering against its base of resilient wire elements with light pressure. Laterally, the sieve surface is bounded in the simplest manner by bending up the hair sieve or filter cloth and securing it at its top rim to the frame of the wires by means of a narrow strip. Finally, the resilient surface is divided up into separate squares by a number of small overflow weirs located transversely to the direction of conveying. The surface may be formed of one or more shallow arcuate sections supported on the tensioned resilient wires which are disposed parallel to the direction of conveying of the material. The wires are fitted in a light frame which forms part of the oscillating mass of an oscillating machine and are vibrated by the latter in the manner of an inertia conveyor to perform small, somewhat upwardly directed oscillations. By means of this basic vibration of the machine and the frame, the pre-tensioned resilient elements vibrate at higher harmonics of their natural frequency, the value of which depends on the length, thickness, and pre-tension of the wires, all of which can readily be calculated. To increase the carrying capacity of the resilient surface, there are provided below the wires, after the pattern of a violin, cross-struts or bridges, the supporting surfaces of which are provided with incisions to receive alternate wires which can then oscillate freely within the strut. If several struts are necessary, these incisions on adjacent struts are then staggered relative to each other, spacing so that a wire which is supported closely at a nodal point on the first strut or bridge, can oscillate freely in the region of the adjacent strut and vice versa. By this simple means the hair sieve or filter cloth is exposed to the oscillation of the wires over its entire surface.

The effectiveness of the method and apparatus of this invention is a function of the quantum of oscillation, It is desirable to vibrate the resilient tensioned elements at the higher harmonics of their natural frequency, which should be made as large as possible. The greater the natural frequency, the greater the number of wave loops which can be obtained to act upon the actual sieve covering in the manner of tiny hammers.

Firstly, as concerns the destruction of the colloidal linkage of particles, the sludge delivered onto the surface is subject to a turbulent motion which increases with an increase in the viscosity or concentration of the sludge. According to the present invention, this turbulence can be increased to such an extent that the sludge dissolves into laminary streams. With this turbulence, the various substances contained in the sludge experience a distinct alternating strain, by reason of which, over a period, the colloidal linkage of the liquid breaks down. The individual mucous particles and mucous membrances are consequently split up and rent asunder, so that more and more liquid becomes free and, under the influence of the acceleration of oscillation, gravitates into the range of the sucking meshes or pores of the supporting surface.

The invention further provides for an acceleration of this destructive process by mixing the sludge before or during delivery onto the surface with fresh water or waste water, and by effecting, in given cases in the course of the conveying route additions of water by means of built in sprinklers. The added water clings to the slimy substances intimately and on all sides, so that, due to their differing inertia, they are dragged along and broken up by the water. If the resilient surface were completely level instead of inclined to the horizontal, the sludge would remain on the spot, and become turbulent about arbitrary axes or would possibly move in different directions.

In order to maintain controlled, constant conveying and thus a continuous output, the invention provides that the resilient surface is given one or more downwardly directed curves, the axes of which lie in the direction of conveying. According to the invention, conveying is further effected by the aforementioned wires or bands by which the sieve covering is held down on the base of tensioned resilient elements. Now, since the turbulence and thus the destruction of the colloidal linking decline with the alignment and acceleration of conveying, the invention provides a number of low overflow weirs, in front of which the sludge, after a short intermediate transport, accumulates to form a spiral, rotating roll, the axis of which is parallel to the weir. The more resilient the wall of the weir is made, the livelier becomes this rolling movement, so that the roll, which becomes continually thicker, rolls open and closes like a carpet. The first weirs, which are located at the point of delivery, are provided on their lower edge with a sealing strip which may be made of sponge rubber and which bears on the resilient surface with a light pressure. With increasing concentration, these sealing strips become superfluous, so that the walls of the weir can oscillate freely above the surface. Finally, the height of the weirs increases somewhat in the direction of conveying, that is to say with increasing concentration, because with increasing viscosity the parts crumbling off the surface of the roll of sludge during the rolling movement climb more easily over the weir.

Secondly, as regards the sucking capacity of the resilient surface provided with meshes or pores, this depends, according to the invention, on the number of oscillation loops of the wires and on the amplitude of the vibration.

Finally, it should be further pointed out that the described construction of the resilient surface can be modified in very many ways. Thus, for instance, the surface may be divided in the manner of a cascade into sections which possess the features described. Furthermore, it is possible within this division to fix each individual frame unilaterally and in a springy manner, so that a resilient set of steps is formed.

One form of suitable apparatus according to the invention is shown in the two figures by way of example.

Fig. 1 shows the machine in side elevation, the upper structure being considered cut open in the middle.

Figure 2:
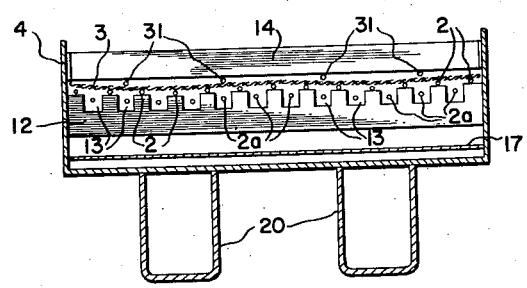

Fig. 2 on the other hand is a partial cross-section taken on line 2—2 in Fig. 1.

Figure 3:
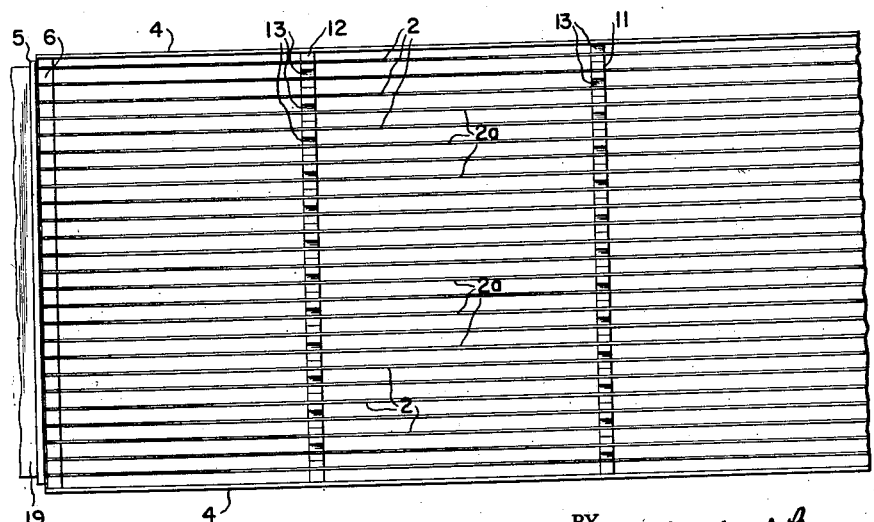

Fig. 3 is a partial plan view of Fig. 1 with the resilient surface removed.

According to Fig. 1, the sludge is fed from a delivery chute 1 onto a porous resilient surface or table of the machine, the surface or table being pervious to liquid but impervious to sludge. The resilient surface or table is formed by parallel wires 2, 2a with a fibrous layer, such as a hair sieve or filter cloth 3, placed loosely over them. In order to hold down the sieve covering and at the same time to increase conveying, wires 31 (see Fig. 2) are stretched directly above the resilient surface in the longitudinal direction of the machine. These wires are lightly supported on the hair sieve or filter cloth 3 and are secured at their ends to the frame 4 of the wires 2, 2a.

At the exit end of the machine, the wires 2, 2a are secured by means of clamping strips 5 to the last cross-strut 6, and at the inlet end of the machine they are stretched over the rollers 7 and secured by a known tensioning device 8. This tensioning device is also rigidly connected to the frame 4.

The wires 2, 2a which can be seen in the drawings, run over the two cross-struts 11 and 12 which act as nodal support points, wire 2a lying closely on the strut 11 and being passed through an incision 13 in strut 12. The cross-struts 11 and 12 act as sonic bridges forming nodal points. In the present embodiment, the wire 2a is therefore divided into two sections of different length, the natural frequencies of which are different. Conversely, the next wire 2 is passed through an incision 13 at strut 11 whilst it is supported closely on the strut 12. In this way, the supporting points of the wires 2, 2a alternate, and further the thickness and pre-tension of each individual wire can be selected as desired. The incisions 13 ensure that the hair sieve or filter cloth 3 is also touched by the oscillating wires 2, 2a in the direct area of the struts 11 and 12 forming nodal points.

The top of the resilient surface is divided into narrow rectangular areas 15 by a number of small overflow weirs 14. A loosely stretched resilient band of spring-hard phosphor-bronze or other equivalent material serves as the weir. The height of the weirs 14 can increase with increasing concentration of the sludge. The first weir behind the inlet is given a resilient packing (not shown) relative to the resilient surface, preferably in the form of a strip of sponge rubber. Similarly, the end of the resilient surface is sealed by a resilient strip 16.

Below the wires 2, 2a an oscillating outlet chute 17 is fitted in the frame 4, the bottom of this chute has a slight gradient and terminates in the mouthpiece 18. Similarly, the concentrated sludge is discharged to the outside via the oscillating chute 19, preferably onto a conveyer belt (not shown).

The frame 4 is placed upon the two hollow supports 20 of the actual oscillating machine, of which supports, only the front one can be seen in Fig. 1. Together with the two hollow supports 20, frame 4 forms the oscillating mass of the machine. The vibratory drive is effected in the known manner by means of an oppositely directed disturbance exciter 22 which is driven from a stationary motor 24 by means of a V-belt 23, the speed of said motor being preferably governable within predetermined limits. Support 20 is mounted on the base rail 26 in known manner by link springs 27 which are inclined to the vertical. Consequently, the masses 20 and thus also the resilient surface connected with the masses 20 have imparted to them periodic vibrations, the direction of which points obliquely upwards. Owing to this basic oscillation of the machine, the tensioned wires 2, 2a or their sections are vibrated in known manner at higher harmonics of their natural frequency, so that the hair sieve or filter cloth oscillating with the basic oscillation receives from underneath across its entire surface small blows, the strength of which can be regulated as required corresponding to the strength of the basic excitation and the synchronisation of the wires.

It can be seen from Fig. 2 that the supporting surface of the struts 6, 11 and 12 is nonplanar and presents two shallow arcuate surfaces. Similarly the rollers 7 are adapted in respect of their height to the curvature of these surfaces. The centre strut shown, say, the strut 12, has a number of incisions 13, which corresponds to half the number of the wires. In each of these incisions 13, one of the wires 2a can vibrate freely whilst the next wire 2 is supported closely on the strut.

In Fig. 2 the hair sieve or filter cloth 3 is bent up at both sides and secured in the frame 4. In each of the two curved surfaces the cover 3 is held down by the guide wires 31. The space under the wires 2, 2a is bounded by the discharge chute 17, which is connected on both sides with the frame 4. The frame 4 is seated on both sides on the hollow supports 20. The masses 20 rest on guide springs 27 which abut on the base rail.

I claim:

1. An apparatus for separating liquids from sludges, including in combination a flexible porous element disposed at an angle to the horizontal, baffles spaced longitudinally and disposed laterally of said porous element to define weirs in the flow path of the sludge, resilient tensioned wire means disposed longitudinally beneath said porous element in supporting relation to said porous element, means supporting said wire means at the opposite ends of said wire means and intermediate the length of said wire means, and means to set said resilient wire means in vibration at their natural frequency and at higher harmonics of their natural frequency.

2. An apparatus for separating liquids from sludges comprising a flexible porous element disposed at an angle to the horizontal, a plurality of laterally spaced resilient tensioned wires extending longitudinally of and beneath said porous element in supporting relation thereto, at least two supporting struts for said wires extending laterally of said wires in longitudinally spaced relation to each other intermediate the length of said wires, each strut providing a nodal support point for alternate wires, adjacent wires being supported at nodal support points on alternate struts.

References Cited in the file of this patent

UNITED STATES PATENTS

| | | |
|---|---|---|
| 275,340 | Kimball | Apr. 3, 1883 |
| 1,093,579 | Van Raalten | Apr. 14, 1914 |
| 1,397,906 | Ruprecht | Nov. 22, 1921 |
| 1,709,286 | Spaulding | Apr. 16, 1929 |
| 1,839,610 | Symons | Jan. 5, 1932 |
| 2,408,558 | Hutchison | Oct. 1, 1946 |
| 2,439,543 | Ketchum | Apr. 13, 1948 |
| 2,617,533 | Linhardt et al. | Nov. 11, 1952 |
| 2,651,419 | Overstrom | Sept. 8, 1953 |

FOREIGN PATENTS

| | | |
|---|---|---|
| 851,672 | France | Oct. 9, 1939 |